United States Patent
Norton et al.

(10) Patent No.: US 10,627,583 B2
(45) Date of Patent: Apr. 21, 2020

(54) CONNECTOR

(71) Applicant: HEWLETT PACKARD ENTERPRISE DEVELOPMENT LP, Houston, TX (US)

(72) Inventors: John Norton, Houston, TX (US); Brandy Dauenhauer Sausse, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/893,575

(22) Filed: Feb. 9, 2018

(65) Prior Publication Data
US 2018/0164512 A1    Jun. 14, 2018

Related U.S. Application Data

(62) Division of application No. 15/200,713, filed on Jul. 1, 2016, now Pat. No. 9,921,374.

(51) Int. Cl.
*G02B 6/38*    (2006.01)
*G02B 6/36*    (2006.01)

(52) U.S. Cl.
CPC ......... *G02B 6/3866* (2013.01); *G02B 6/3817* (2013.01); *G02B 6/3672* (2013.01); *G02B 6/3849* (2013.01); *G02B 6/3885* (2013.01)

(58) Field of Classification Search
CPC ............................. G02B 6/3866; G02B 6/3817
See application file for complete search history.

(56) References Cited

U.S. PATENT DOCUMENTS

| | | | |
|---|---|---|---|
| 6,543,941 B1* | 4/2003 | Lampert | G02B 6/3807 385/58 |
| 6,853,794 B2 | 2/2005 | Lu et al. | |
| 2002/0162582 A1 | 11/2002 | Chu et al. | |
| 2007/0034227 A1 | 2/2007 | Hesch et al. | |
| 2012/0129409 A1* | 5/2012 | Drew | A61N 1/3752 439/843 |
| 2013/0035550 A1* | 2/2013 | Watanabe | G02B 6/4298 600/132 |
| 2015/0043881 A1 | 2/2015 | Suzuki | |
| 2015/0370014 A1* | 12/2015 | Poh | G02B 6/43 15/94 |
| 2016/0352258 A1* | 12/2016 | Nishitani | G02B 7/10 |
| 2017/0038470 A1* | 2/2017 | Hirakawa | B60R 19/483 |

FOREIGN PATENT DOCUMENTS

EP        1965516 A1    9/2008

OTHER PUBLICATIONS

ChristopherKblog, "Canon EOS—Integrated Cleaning System", available online at <https://www.youtube.com/watch?v=x939m5bGhFM>, May 21, 2009, 1 page.

* cited by examiner

*Primary Examiner* — Chris H Chu
(74) *Attorney, Agent, or Firm* — Hewlett Packard Enterprise Patent Department

(57) ABSTRACT

An optical connector may include a vibrational element and a pair of traces to power the element. A corresponding connector receptacle includes a pair of pins to provide power to the vibrational element via the traces.

5 Claims, 6 Drawing Sheets

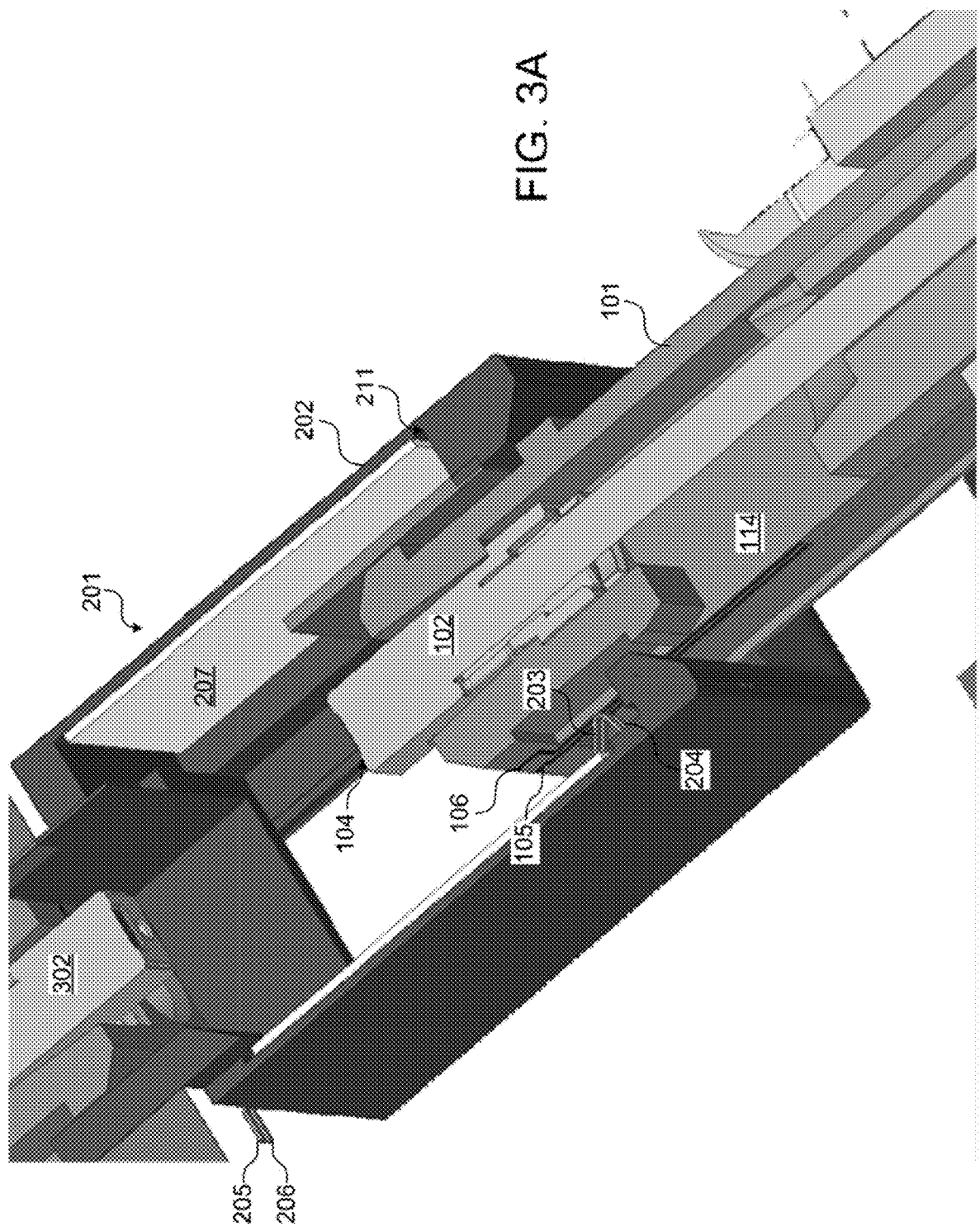

CONNECTOR

BACKGROUND

Optical connectors may be used where a connect/disconnect capability is required in an optical communication system. Optical connectors may be used to, for example, connect any kind of optical equipment such as waveguides (e.g., optical fibers), or optical transceivers. For example, an optical connector may be used to interconnect optical fibers, or to connect an optical fiber to an optical transceiver. Optical connectors may be designed for temporary interconnection of optical equipment. However, existence of dirt, including dust particles, contaminants or similar, on the connection faces of the optical connectors may partially occlude the light going from one optical fiber to another, significantly reducing connection bandwidth.

BRIEF DESCRIPTION OF THE DRAWINGS

Certain examples are described in the following detailed description and in reference to the drawings, in which:

FIGS. 3A-3C illustrate a cross-sectional views of a connector being inserted into a receptacle.

DETAILED DESCRIPTION OF SPECIFIC EXAMPLES

Implementations of the disclosed technology automatically clean the face of an optical connector while it is inserted into a connector receptacle. In some examples, the connector receptacle includes pins to power a piezoelectric element disposed on the connector. The piezoelectric element vibrates an optical ferrule on the connector, dislodging dust and thereby cleaning the optical ferrule. Once the connector is fully seated in the connector, the electrical connection between the pins and the piezoelectric element is broken, ending the cleaning process. In some implementations, the sides of the receptacle may include an adhesive material to capture dislodged dust. In additional implementations, the connector may be composed of an antistatic material to reduce attraction of dust to the connector. In further implementations, the ferrule may have a negatively charged optically clear film applied to it to repel reduce the adhesion between dust and the face of the ferrule.

Figure 1A:
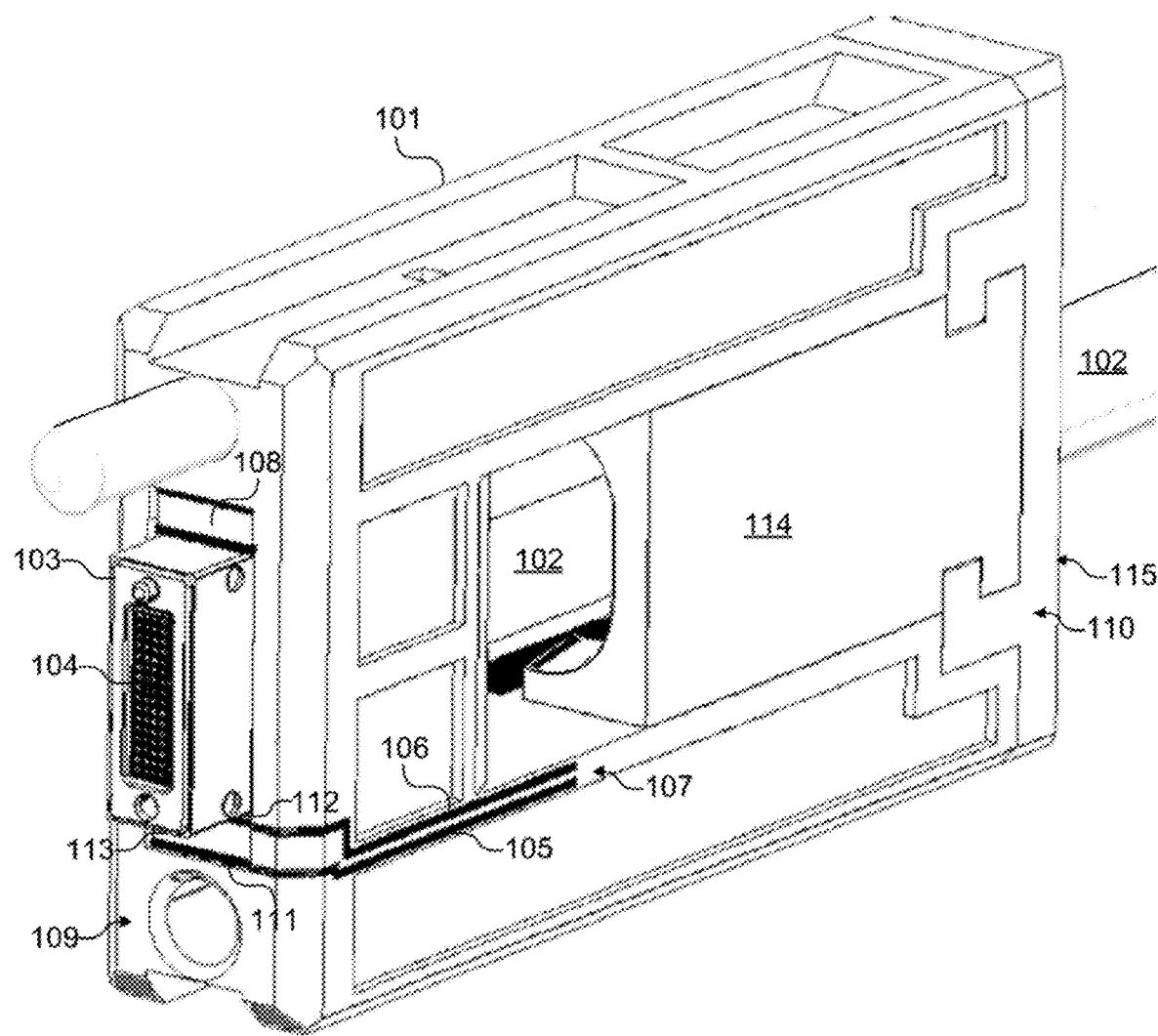
FIGS. 1A and 1B illustrates a connector including a vibrator to clean an optical ferrule.
Figure 1B:
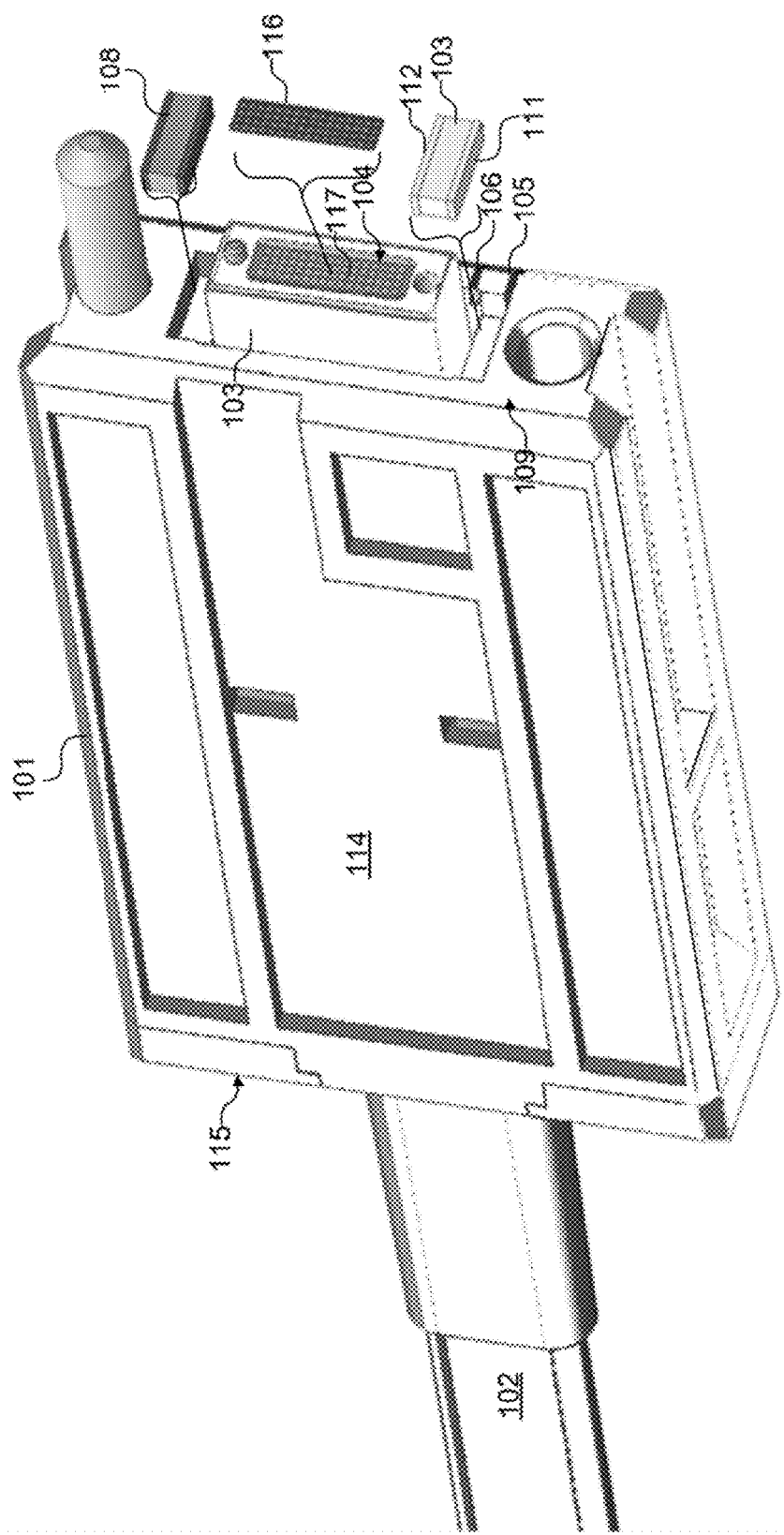

FIGS. 1A and 1B illustrates a connector 101 including a vibrator 113 to clean an optical ferrule 103.

The illustrated connector 101 comprises a connector body 114. The connector body 114 retains an optical cable 102 comprising a set of one or more optical fibers 117. For example, the connector body 114 may encompass the optical cable 102. In some implementations, the connector body may comprise an antistatic material. For example, the connector body may be molded with an antistatic plastic or may be coated with an antistatic material.

The connector 101 includes a ferrule 103 coupled to a front face 109 of the connector body 114. The ferrule 103 is coupled to the optical cable 102 and retains the optical fibers 117, presenting a face 104 comprising the optical interface formed by the ends of the optical fibers. In some implementations, the ferrule face 104 may comprise an optically clear, negatively charged material. The negatively charged material may repel dust or reduce the adhesion of dust to the face 104. For example, an optically clear, negatively charged film 116 may be disposed on the front of the face 104.

The connector 101 further comprises the vibrator 113 proximal to the ferrule 103. For example, the vibrator 113 may be a piezoelectric element. The element 113 may be coupled to the ferrule 103. As another example, the element 113 may be coupled to the front face 109 of the connector body 114 adjacent to the ferrule 103.

The connector 101 further comprises a pair of power traces 105, 106. The pair of traces 105, 106 are coupled to the piezoelectric element's power contacts 111, 112, respectively, and are disposed on a side face 110 of the connector body 114. When a driving voltage is applied across the traces 105, 106, the piezoelectric element 113 vibrates. The vibration is imparted to the ferrule 103, causing the ferrule 103 to vibrate, cleaning the face 104 by shaking dust off.

In this implementation, each trace 106, 105 is disposed in a region of the side face 110 of the connector body 114 that is encompassed by a receptacle when the connector body 114 is fully seated in the receptacle. In other words, when the connector 101 is fully seated, the traces are fully disposed within the receptacle. For example, the ends of the traces 106, 105 may be located 107 away from an outer face 115 of the connector body 114. As discussed below, this arrangement may result in the piezoelectric element 113 being powered while the connector 101 is being inserted into the receptacle but not powered once the connector 101 has passed a certain insertion point.

The connector 101 may further include a resilient element 108 adjacent to ferrule 103. For example, the resilient element 108 may be disposed on the front face 109 opposite the piezoelectric element 113 such that the ferrule 103 is between the piezoelectric element 112 and the resilient element 108.

Figure 2:
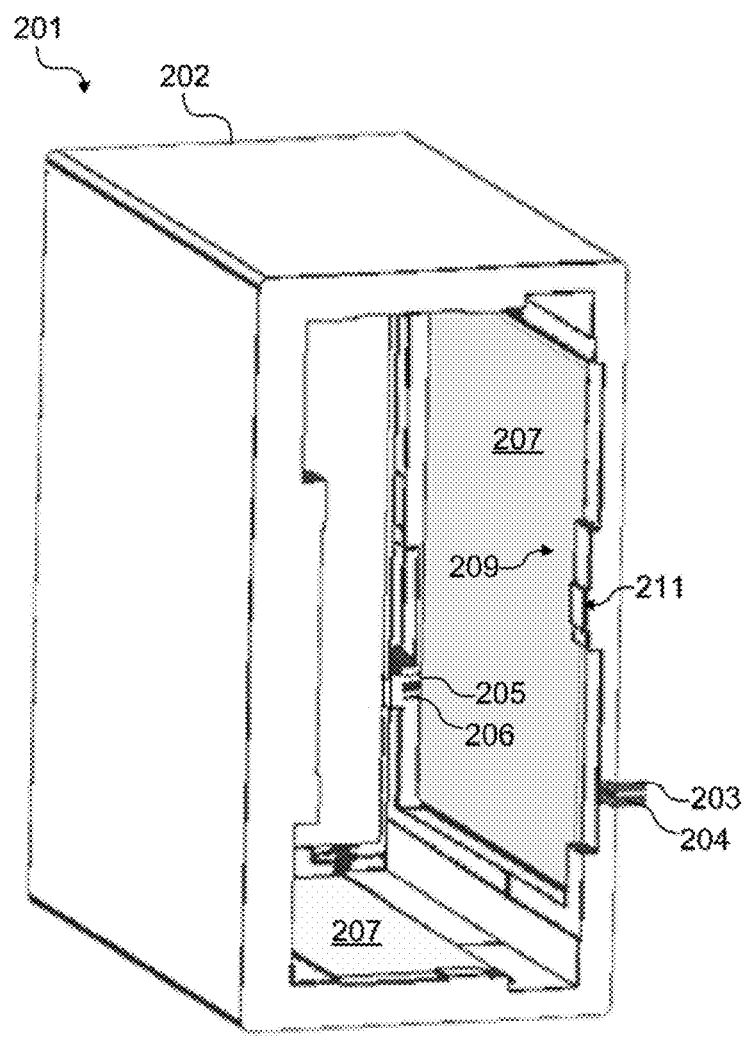
FIG. 2 illustrates an example optical connector receptacle 201 to power a connector vibrational element while the connector is being inserted into the receptacle.

FIG. 2 illustrates an example optical connector receptacle 201 to power a connector vibrational element while the connector is being inserted into the receptacle.

The receptacle 201 may include a receptacle housing 202. For example the housing 202 may be mounted to a server to provide a receptacle for connecting two optical connectors.

The receptacle 201 may include a pair of pins 203, 204 disposed proximal to a rim 211 of the receptacle housing 202. The receptacle further includes traces 205, 206 to connect the pins 203, 204 to a power supply rail of a printed circuit assembly ("PCA"). For example, the pins 203, 204 may be connected to the power supply when the receptacle 201 is mounted to the PCA. In use, the pins 203, 204 deliver power to a vibrational element mounted on a connector via corresponding traces while the connector is being inserted into the receptacle.

In some implementations, the receptacle 201 may include an adhesive material 207 disposed on an inner face 209 of the housing 202. In further implementations, the receptacle 201 may include the adhesive material 207 disposed on each inner face of the housing 202. The adhesive material may trap dirt or dust that is introduced inside the receptacle 201. For example, the adhesive material 207 may trap dust that is shaken free from the connector.

Figure 3B:
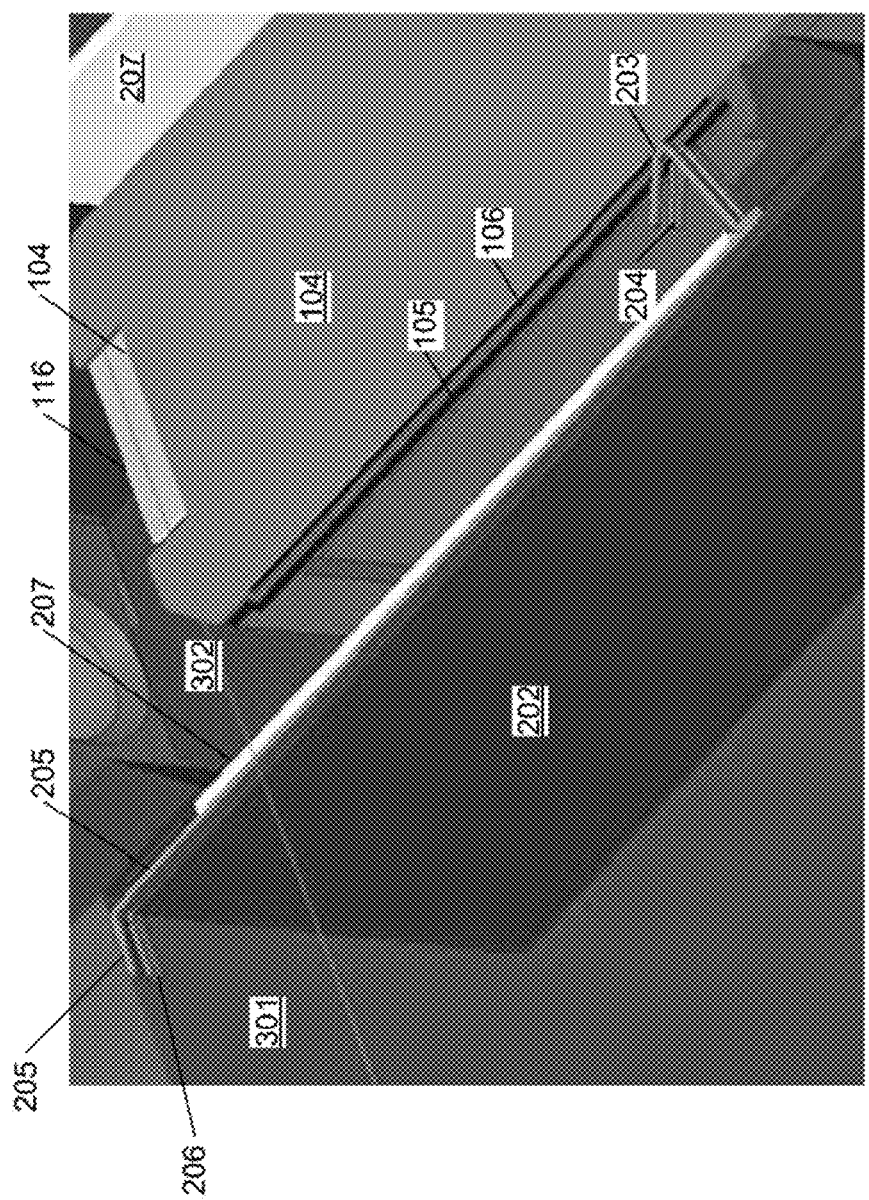
Figure 3C:
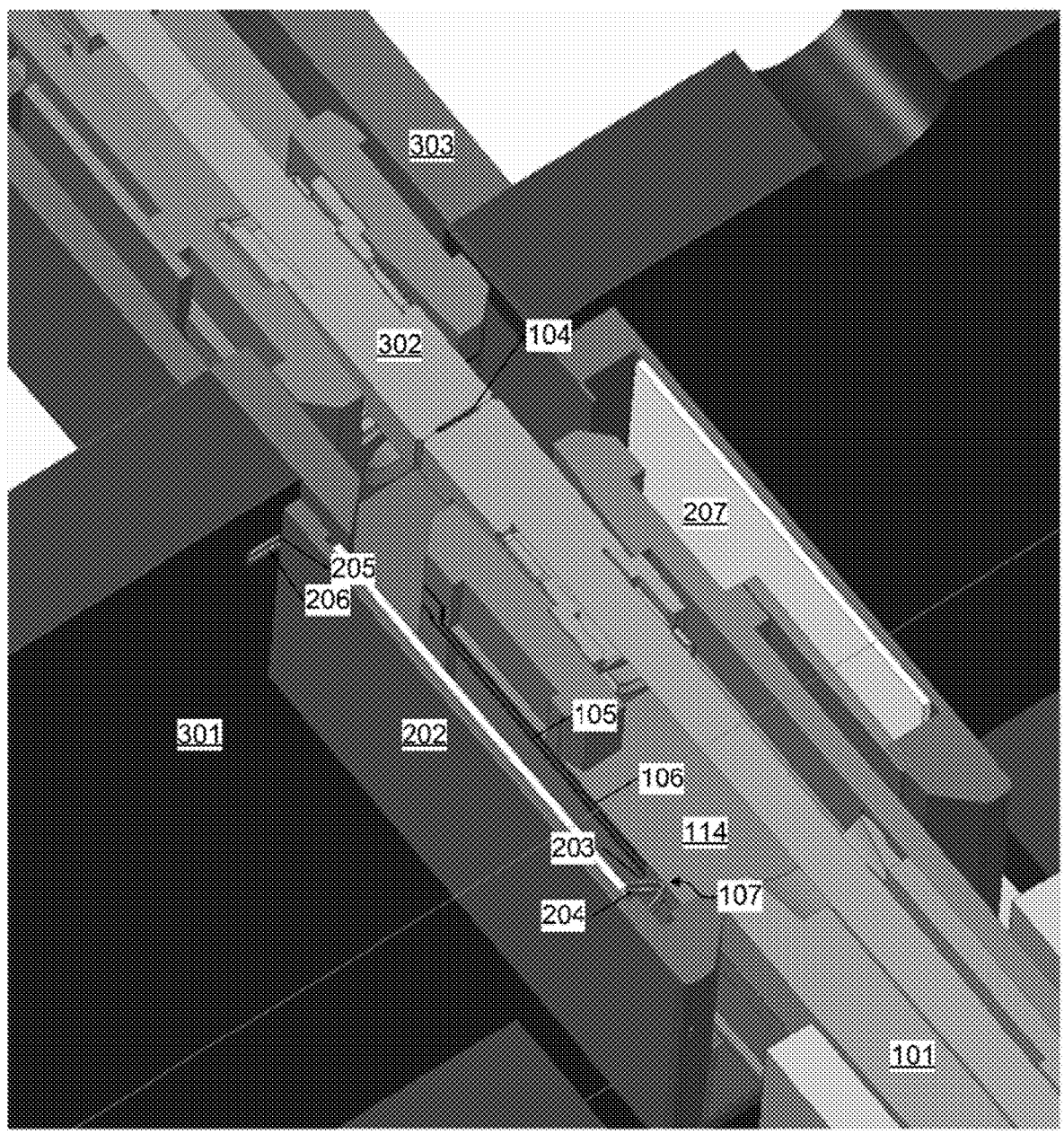

FIGS. 3A-3C illustrate a cross-sectional views of the connector 101 of FIGS. 1A-1B being inserted into the receptacle 201 of FIG. 2. FIG. 3A illustrates the connector 101 while it is being inserted into the receptacle 201 prior to the connector 101 being fully seated. FIG. 3B illustrates the contact between the pins and the traces during insertion. FIG. 3C illustrates the connector 101 seated in the receptacle 201.

As illustrated in FIGS. 3A and 3B, while the connector 101 is inserted into the receptacle 201, the traces 105, 106 on the side of the housing contact respective pins 203, 204. This electrically couples the traces 105, 106 to the pins 203, 204 to deliver power to the vibrator 113 via the connection of the traces 205, 206 to the power rail of the server 301.

As illustrated in FIG. 3C, once the connector 101 is fully seated in the receptacle 201, the location 107 of the ends of the traces 105, 106 are separated from the pins 203, 204. Accordingly, the electrical coupling of the traces 205, 206 to the traces 105, 106 is broken, depowering the vibrator 113. Thus, the pair of traces 105, 106 and the pair of pins 203, 204 are disposed such that power is delivered to the vibrator 113 while the connector 101 is inserted into the receptacle 201 but is not delivered to the vibrator 113 when the connector is seated in the receptacle.

Although the vibrational cleaning of the ferrule is described with respect to insertion, the pins 203, 204, will also contact the traces 105, 106 when the connector 101 is removed from the receptacle 201. Accordingly, the ferrule 103 will be cleaned during removal as well as insertion.

FIGS. 3A-3C illustrate a second optical connector 302 disposed within a second receptacle 303. In some implementations, the second connector 302 may include a vibrational element and the second receptacle 303 may include power pins to power the vibrational element. For example, the second connector 302 and the second receptacle 303 may be implemented as described with respect to FIGS. 1 and 2. In other implementations, the second connector 302 and second receptacle 303 lack these cleaning features. For example, the second connector 302 and receptacle 303 may be internal to a server or a chassis. Accordingly, the second connector 302 may not be frequently exposed to dust or may not be frequently connected and disconnected.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A connector, comprising:
 a connector body;
 a ferrule coupled to a front face of the connector body;
 a piezoelectric element proximal to the ferrule;
 power traces, each power trace coupled to the piezoelectric element and disposed on a side face of the connector body, wherein the power traces are unconnected to a power supply when the connector is not inserted into a receptacle.

2. The connector of claim 1, wherein:
 each trace is disposed in a region of the side face of the connector body that is encompassed by the receptacle when the connector body is fully seated in the receptacle.

3. The connector of claim 1, further comprising:
 a resilient element adjacent to the ferrule.

4. The connector of claim 1, wherein the face of the ferrule comprises negatively charged material.

5. The connector of claim 1, wherein the connector body comprises an antistatic material.

* * * * *